2,786,079
Patented Mar. 19, 1957

2,786,079

PRODUCTION OF ORGANIC THIOLS

Hillis O. Folkins, Crystal Lake, Ill., assignor to The Pure Oil Company, Chicago, Ill., a corporation of Ohio No Drawing. Application December 28, 1953,
Serial No. 400,807

16 Claims. (Cl. 260—609)

This invention relates to a process for the preparation of organic thiols by reacting the corresponding alcohol and hydrogen sulfide at reaction conditions of temperature and pressure in the presence of a composite catalyst of activated alumina promoted with a suitable heat stable material. More specifically the invention is concerned with maintaining the efficiency of these composite catalysts at a high level during their use in facilitating the interaction between the alcohol and hydrogen sulfide.

In organic chemical conversion processes, wherein reactants are contacted at conversion conditions in the presence of a solid catalyst which may be in either a granular, pelleted or a pulverulent form, the efficiency of the catalyst may be deleteriously affected in several ways. The processing of high molecular weight materials at elevated temperatures is conducive to a number of secondary reactions which are accompanied by the formation of a carbonaceous material. This substance, which is generally termed coke, accumulates on the catalyst surfaces and substantially decreases the activity of the catalyst. This, however, is only a temporary condition which can be remedied by exposing the contaminated catalyst at an elevated temperature to an oxidizing atmosphere. Exposure to these conditions results in the combustion of the coke and its subsequent removal to produce a regenerated catalyst which can be reused. This "deactivation," while troublesome, is a cyclic condition which can be overcome by the use of regenerative equipment in which the deactivated catalyst can regularly be reprocessed as one phase of a regulated processing cycle.

There is also a number of reactions involving the reaction of low molecular weight organic materials at elevated temperatures and pressures. While coke formation problems do not generally obtain in these catalyzed reactions, the catalysts are inimically affected in a manner which differs from the aforementioned deactivation, not only with regard to the time element involved but also in the manner in which the depreciation in efficiency is brought about. Thus in the production of thiols, wherein a suitable alcohol and hydrogen sulfide are transformed under conversion conditions of temperature and pressure in the presence of a composite catalyst containing activated alumina and a heat stable material which functions to enhance the catalytic effect of the alumina, the activity of the catalyst slowly deteriorates without any change being made in the surface conditions of the catalyst because of coke laydown. In order to avoid confusing this decremental modification of the catalyst efficiency with the aforementioned deactivation resulting from coke formation, this condition will hereinafter be referred to as "degeneration."

It is therefore an object of this invention to avoid or overcome the degeneration of catalysts containing activated alumina and a heat stable material to promote the activity of the alumina during its use in facilitating the of thiols from a suitable alcohol and hydrogen a further object of this invention to avoid the degeneration of activated alumina catalysts promoted by suitable heat stable materials in the reaction between hydrogen sulfide and methanol to produce methanethiol. These and other objects will be made more apparent by the following detailed discussion of the instant invention.

Although the preparation of the lower molecular weight thiols, such as methanethiol, has been made the subject of a number of investigations, most investigators relied on the use of catalysts whose efficiencies had been previously established. One such catalyst which has found considerable use in promoting the reaction between an alcohol and hydrogen sulfide to produce the thiol corresponding to the alcohol reactant is thoria, which heretofore has been considered to be the most efficient catalyst for use in the production of thiols in this manner. However, this catalyst has a number of disadvantages which would generally preclude its use in commercial operations. The main objections are its high cost of preparation, destruction of its catalytic activity by exposure of the catalyst to temperatures slightly above the reaction temperature, susceptibility to attrition which prevent its use in fluidized systems and comparatively low conversions. Catalyst studies have been made which resulted in the discovery of a number of activated alumina catalysts in combination with promoting agents which overcome these objections. Composite catalysts containing activated alumina which may be used in carrying out the instant invention include activated alumina in combination with oxides of the alkali and alkaline earth metals, the alkali metal carbonates, phosphates, halides, sulfides, and sulfates, as well as the heat stable salts of an oxy acid of a metal selected from the group consisting of tungsten, chromium, molybdenum, uranium, vanadium. To simplify the following discussion of the subject invention the foregoing metallic promoters for activated alumina will hereinafter be referred to in the specification as a heat stable promoter or heat stable promoters for enhancing the catalytic activity of the alumina catalyst. Specific examples of suitable heat stable promoters include calcium oxide, magnesium oxide, barium oxide, lithium oxide, potassium oxide, sodium oxide, potassium tungstate, copper molybdate, aluminum vanadate, iron nickel or cobalt manganate, sodium carbonate, potassium phosphate, etc.

The activated aluminas which may be employed in a major proportion in the composite catalyst are those types of sorptive aluminum oxides which in general have surface areas in excess of around 10 square meters per gram. Activated alumina resulting from either naturally occurring materials, such as bauxite, or those prepared synthetically may be used. A common variety is prepared by controlled calcination of a rock-like form of alpha alumina trihydrate. This type is exemplified by Alcoa Activated Alumina Grade F. A second variety typified by Alcoa Activated Alumina Grade H is composed of translucent granules prepared from a gelatinous alumina which has a high surface area even before any decomposition of the alumina hydrate is effected. A third type of sorptive alumina comprises discrete particles of such small size that they have appreciable area on their outer geometric surface. Examples of this type are Alcoa Activated Alumina R-2396 and Alcoa Activated Alumina XF-21. Activated aluminas resulting from other well known methods of preparation may be employed also. The size and shape of the catalyst will be determined by how the catalyst is to be employed. Desired physical forms may be obtained by adding the promoter to a granular, pelleted or fluid type activated alumina, or by processing the finished catalyst to obtain the required shape and size. The subject invention may be carried out in a static or moving bed type of reactor employing granular or pelleted catalysts. However, a fluidized system may also be used and in this instance a finely comminuted catalyst must be used.

In spite of a number of advantages that accrue through the use of these composite activated alumina catalysts in the production of methanethiol they are not trouble free. However, the only important disadvantage is a gradual loss in selectivity and activity because of degeneration. According to this invention it has been found that this difficulty can be remedied and the initial activity and selectivity of these catalysts can be maintained indefinitely by injecting into the catalyst zone concomitant with the introduction of the reactants a small amount of an alkali or alkaline earth metal salt of an organic acid. Examples of these compounds which are particularly useful include potassium acetate, sodium formate, lithium acetate, lithium benzoate, calcium acetate, calcium salicylate, strontium tartrate, barium butyrate, barium acetate, magnesium tartrate, potassium tartrate, potassium oxalate, sodium tartrate. In addition to maintaining the initial activity and selectivity of the aforementioned activated alumina catalysts, it has also been found that this invention may be used to reactivate catalysts whose initial activity and selectivity has appreciably degenerated. In employing the instant invention, it is only necessary that the catalyzed reaction be carried out in the presence of added amounts of the above listed alkali or alkaline earth metal salts of an organic acid. This may be done by introducing the desired reagent into the reaction zone either separately or in the admixture with the reactants. When this latter method is employed, it is preferred that the alkali or alkaline earth metal salt of an organic acid may be added continuously, although frequently it may be more desirable to add it intermittently as required to restore catalyst activity to its original level. In the latter instance, appreciable concentrations of alkali or alkaline earth metal salts of an organic acid of this invention may be added at definite intervals when catalyst activity has dropped enough to warrant reactivation. In order to obtain the benefits of this invention, it is only necessary to add small amounts of the alkali or alkaline earth metal salts of an organic acid to the reaction zone. Although other substances used in carrying out the subject reaction can be used as the reference material to facilitate a determination of the amount of alkali or alkaline earth metal salt of an organic acid which is to be added, it is preferred that the amount of alcohol which is charged to the reaction zone can be used as the base, for example, when methanol is employed as a reactant, it has been found that an alkali or alkaline earth metal salt of an organic acid in an amount equal to from about 0.01 to 1.0 wt. percent of the methanol charged is satisfactory. However, in some instances as little as 0.001% of alkali or alkaline earth metal salt of an organic acid based on methanol or as much as 5% may be necessary. The higher concentrations will be used generally in cases where the salts are being charged in intermittent fashion for the purpose of reactivating catalysts which have lost initial activity. It is to be understood that the foregoing basis for determining the amount of alkali or alkaline earth metal salt of an organic acid which is to be added to the reaction zone is only illustrative and that the other suitable bases, such as total reactants or hydrogen sulfide, may be used.

The advantages of this invention are illustrated by the following illustrative but non-limiting examples:

(1) A reaction mixture of hydrogen sulfide and methanol in a mol ratio of 2 to 1 was reacted at 750° F. atmospheric pressure, and at a liquid hourly space velocity of 0.38 over a fluidized catalyst composed of activated alumina, promoted by 6 weight percent potassium carbonate. An initial conversion of methanol of 81 percent is obtained with a selectivity for mercaptan formation of 93 percent. Over a period of 140 hours of operation conversion decreases to 71 percent and the selectivity of reaction to mercaptan was reduced to 86 percent. In another operation, using the same conditions as above and a different charge of potassium carbonate promoted-activated alumina catalyst having the above composition, potassium tartrate is introduced into the reaction zone continuously with the methanol at a concentration of 0.05 weight percent based on the methanol. Initial conversion and selectivity are the same as for the initial stages of the run without potassium tartrate. After a period of 150 hours of continuous operation, neither the conversion or selectivity is impaired.

(2) In another example, hydrogen sulfide and methanol were charged, in a 2 to 1 mol ratio, at 750° F. and atmospheric pressure, over a fluidized catalyst composed of activated alumina promoted by 2 weight percent of potassium oxide. Initial conversion of methanol was 83 percent with a selectivity for mercaptan formation of 86 percent. After 40 hours of operation, conversion drops 3 percent. At this time potassium oxalate is added to the methanol being charged at the rate of 1 weight percent of the methanol and the experiment is continued. At the conclusion of a 4 hour period during which the potassium oxalate is added, the conversion of methanol increases to the original level of 83 percent.

(3) Hydrogen sulfide and methanol, in a mol ratio of 2 to 1, are reacted at 750° F., atmospheric pressure and at a liquid volume hourly space velocity of 0.4 over a fluidized catalyst composed of activated alumina, promoted by 2 weight percent of calcium oxide. A conversion of 78 percent, with a mercaptan selectivity of 75 percent is obtained. Over a 20 hour period, the selectivity drops to 70 percent while conversion remains constant. In a similar run, in which calcium acetate is added at a concentration of 0.1 weight percent, based on the methanol charged, the original selectivity of 75 percent for mercaptan formation is maintained throughout a 20 hour period of operation.

(4) In another example using a fresh batch of the same calcium oxide-on-alumina catalyst as in Example 3, above, and the same conditions of operation, barium butyrate is added at a concentration of 0.1 percent of the methanol charged. Initial conversion and selectivity of 78 and 75 percent, respectively, are maintained over a period of 30 hours of operation.

In each of the foregoing sets of examples, it is seen that in one instance the reaction was carried out in the presence of added amounts of an alkali or alkaline earth metal salt of an organic acid, whereas in the other example, methanethiol was prepared by reacting methanol and hydrogen sulfide in the presence of an activated alumina catalyst in a reactor free from any added amounts of an alkali or alkaline earth metal salt of an organic acid. These comparative demonstrations show that in carrying out the instant invention the efficiency of the thiol-producing reaction involving an alcohol and hydrogen sulfide was enhanced by maintaining the high activity and selectivity of the composite activated alumina catalyst having combined therewith a suitable "heat stable metallic promoter." Although the foregoing examples were conducted using methanol as the alcohol reactant, it is intended that these examples be non-limiting and that the subject invention be employed, if desired, in carrying out the reaction between hydrogen sulfide and higher molecular weight alcohols, such as ethanol, "Lorol" alcohols which are proprietary alcohols marketed by the Du Pont Company comprising admixtures of alcohols having the following general formula:

$$CH_3(CH_2)_nCH_2OH$$

where $n$ is 8, 10, 12, 14, 16, nonyl alcohols as well as dodecyl and higher alcohols to produce the corresponding thiol. Accordingly this invention has application in the catalytic treatment of $C_1$–$C_{18}$ aliphatic alcohols with hydrogen sulfide to produce the corresponding thiol.

The reaction conditions employed in carrying out the foregoing examples are to be considered as illustrative and non-limiting. The thiol-producing reaction carried out in accordance with this invention will ordinarily be conducted at a temperature of about 575°–930° F. Other operating conditions which may be varied include pressure, space velocity, and reactant ratio. Pressures may vary widely and as a result the process may be operated at subatmospheric, atmospheric, or superatmospheric pressures. Space velocity, which for the purposes of this discussion is defined as the liquid volume of methanol charged per hour per unit volume of catalyst bed or per unit volume of effective reactor, may range from about 0.1 to about 5. Although it may be preferred to employ substantially stoichiometric proportions of reactants, the mol ratio of reactants may be from about 0.5–5 mols of hydrogen sulfide per mol of alcohol. However, operating conditions outside these ranges may be employed.

The instant invention is applicable to thiol-producing processes carried out in reactions employing either fixed bed, moving bed, or fluidized catalyst. Although there is some diminution in the activity of the pelleted or granular catalyst employed in fixed or moving catalyst bed type of operation, a greater degree of catalyst deactivation is experienced in processing an alcohol and hydrogen sulfide in the presence of a fluidized catalyst. Accordingly this invention will have greater utility in carrying out this latter type of process.

What is claimed is:

1. In the production of a $C_1$–$C_{18}$ aliphatic thiol by the reaction of a $C_1$–$C_{18}$ aliphatic alcohol and hydrogen sulfide in the presence of an activated alumina catalyst having in combination therewith at least one heat stable promoter selected from the group consisting of oxides of the alkali and alkaline earth metals, alkali metal carbonates, phosphates, halides, sulfides, and sulfates, and heat stable salts of the oxy acids of tungsten, chromium, molybdenum, uranium, and vanadium at suitable reaction conditions of temperature and pressure, said catalyst being capable of promoting the efficiency of said reaction and being susceptible to degeneration in catalytic activity during use, the improvement which comprises carrying out said production in the presence of an added amount of at least one salt selected from the group consisting of alkali and alkaline earth metal salts of carboxylic acids in a quantity sufficient to maintain the activity and selectivity of said activated alumina catalyst.

2. In the production of methanethiol by the reaction of methanol and hydrogen sulfide in the presence of an activated alumina catalyst having in combination therewith at least one heat stable promoter selected from the group consisting of oxides of the alkali and alkaline earth metals, alkali metal carbonates, phosphates, halides, sulfides, and sulfates, and heat stable salts of the oxy acids of tungsten, chromium, molybdenum, uranium, and vanadium at suitable reaction conditions of temperature and pressure, said catalyst being capable of promoting the efficiency of said reaction and being susceptible to degeneration in catalytic activity during use, the improvement which comprises carrying out said production in the presence of an added amount of at least one salt selected from the group consisting of alkali and alkaline earth metal salts of carboxylic acids in a quantity sufficient to maintain the activity and selectivity of said activated alumina catalyst.

3. A method for producing methanethiol by the reaction of methanol and hydrogen sulfide at a temperature of about 575°–930° F., a pressure of about atmospheric, a liquid hourly volume space velocity of from about 0.1 to 5, and a mole ratio of reactants of from about 0.5–5 moles of hydrogen sulfide per mole of methanol in the presence of an activated alumina catalyst having in combination therewith at least one heat stable promoter selected from the group consisting of oxides of the alkali and alkaline earth metals, alkali metal carbonates, phosphates, halides, sulfides, and sulfates and heat stable salts of the oxy acids of tungsten, chromium, molybdenum, uranium, and vanadium, the improvement which comprises carrying out said production in the presence of an added amount of at least one salt selected from the group consisting of alkali and alkaline earth metal salts of a carboxylic acid, in a quantity sufficient to maintain the activity and selectivity of said activated alumina catalyst at a constant level.

4. A method in accordance with claim 3 in which said salt is continuously introduced into the reaction zone during said production.

5. A method in accordance with claim 3 in which said salt is intermittently introduced into the reaction zone as the catalyst evinces decreased activity and selectivity.

6. A method in accordance with claim 3 in which the salt is potassium tartrate.

7. A method in accordance with claim 3 in which the salt is potassium oxalate.

8. A method in accordance with claim 3 in which the salt is sodium tartrate.

9. A method in accordance with claim 3 in which the salt is calcium acetate.

10. A method in accordance with claim 3 in which the salt is barium butyrate.

11. The improvement in accordance with claim 1 in which said salt is present in an amount equal to about 0.01 to 1.0 weight percent of the alcohol employed in said production.

12. The improvement in accordance with claim 2 in which said salt is present in an amount equal to about 0.01 to 1.0 weight percent of the methanol employed in said production.

13. The improvement in accordance with claim 3 in which said salt is present in an amount equal to about 0.01 to 1.0 weight percent of the methanol employed in said production.

14. The improvement in accordance with claim 1 in which said activated alumina catalyst has in combination therewith an alkali metal carbonate as the heat stable promoter.

15. An improvement in accordance with claim 1 in which the activated alumina catalyst has in combination therewith a small amount of alkaline metal oxide as the heat stable promoter.

16. An improvement in accordance with claim 1 in which the alkaline earth metal oxide is used as a heat stable promoter.

References Cited in the file of this patent

Fieser et al.: Org. Chem., 2nd ed., Heath, 1950, page 32.